United States Patent [19]

Imai et al.

[11] Patent Number: 4,504,124

[45] Date of Patent: Mar. 12, 1985

[54] ZOOM LENS SYSTEM

[75] Inventors: Toshihiro Imai; Yasuzi Ogata, both of Hachiooji, Japan

[73] Assignee: Olympus Optical Co., Ltd., Tokyo, Japan

[21] Appl. No.: 462,453

[22] Filed: Jan. 31, 1983

[30] Foreign Application Priority Data

Feb. 10, 1982 [JP] Japan ................................. 57-20221

[51] Int. Cl.$^3$ .............................................. G02B 15/18
[52] U.S. Cl. .................................... 350/427; 350/423
[58] Field of Search ............................. 350/423, 427

[56] References Cited

U.S. PATENT DOCUMENTS 4,240,700 12/1980 Ogawa et al. ..................... 350/423

FOREIGN PATENT DOCUMENTS 56-14213  2/1981  Japan .................................... 350/427
2072372   9/1981  United Kingdom ................ 350/423

Primary Examiner—John K. Corbin
Assistant Examiner—Scott J. Sugarman
Attorney, Agent, or Firm—Cushman, Darby & Cushman

[57] ABSTRACT

A zoom lens system comprising a first lens group having positive power and having the focusing function, a second lens group having negative power and having the magnification-varying function, a third lens group having positive power and having the magnification-varying function, and a fourth lens group having positive power and having the magnification-varying function, the zoom lens system being arranged to have a large zoom ratio, i.e., the range of field angle from 24° to 62°, and numerical aperture of F/4 and being arranged compactly.

13 Claims, 7 Drawing Figures

# ZOOM LENS SYSTEM

BACKGROUND OF THE INVENTION (a) Field of the Invention

The present invention relates to a compactly arranged zoom lens system with a range of field angle from 24° to 62° including the field angle of standard lens systems, i.e., about 47°, of which the overall length is short, outer diameter is small, and aperture ratio is F/4.

(b) Description of the Prior Art

In recent years, there is a great demand for zoom lens systems in the field of photographic lens systems and the like because they ensure high mobility and convenience at the time of use. Especially, zoom lens systems with ranges of field angles including the field angle about 47°, which is the field angle of standard lens systems, are in increasing demand. For this kind of zoom lens systems, there is such tendency that a zoom lens system with a large zoom ratio will be required in near future. When, however, the zoom ratio is made large, the zoom lens system as a whole tends to become large in size, and this is not desirable. In other words, it is required to provide a zoom lens system having a large zoom ratio and, at the same time, arranged compactly. As a known zoom lens system designed for the purpose of fulfilling the above-mentioned requirements, there is a zoom lens system disclosed for example in Japanese published unexamined patent application No. 156912/80. However, the above-mentioned zoom lens system is not satisfactorily compact because the front lens thereof has a large diameter and it is necessary to use a filter of 72 mm in diameter.

SUMMARY OF THE INVENTION

It is, therefore, a primary object of the present invention to provide a compactly arranged zoom lens system of which the zoom ratio is about 2.8, i.e., the field angle thereof is variable from 24° to 64°, the overall length is short, the outer diameter is small, and the maximum aperture ratio is F/4.

To design a high vari-focal ratio zoom lens system comprising four lens groups and having a zoom ratio exceeding 2, it is important to select the ratio between the focal length of the first lens group and absolute value of magnification of the vari-focal sub-system, which comprises the second, third and fourth lens groups, within a suitable range. This is because the focal length of the lens system as a whole in each position in zooming (each position in the range from the wide position to the teleposition) is given as the product of the focal length of the first lens group and magnification of the vari-focal sub-system. Besides, it is also important to decide the ratio of variation in magnification of each lens group in the vari-focal sub-system (hereinafter referred to as the "magnification share in zooming" of each lens group in the vari-focal sub-system) as a suitable value.

When deciding these values, in the paraxial theory the distance between the principal point and object point of each lens group is given by $f(1-1/\beta)$ and the distance between the principal point and image point of each lens group is given by $f(1-\beta)$, where, reference symbol f represents the focal length of the lens system as a whole and reference symbol $\beta$ represents magnification. Besides, as each lens group is arranged to comprise a plural number of lens elements in order to make the aperture ratio large and to correct aberrations favourably, the principal point of each lens group comes to a position different from the position of the outer lens surface of the lens group. Therefore, it is necessary to pay attention so that the lens groups will not interfere with each other.

The zoom lens system according to the present invention is arranged by taking the above-mentioned points into consideration and is arranged to make the zoom ratio large and to make the lens system as a whole compact by adopting the basic composition shown below. That is, as shown in FIG. 1, the zoom lens system according to the present invention is arranged to comprise a first lens group I having positive power and having the focusing function, a second lens group II having negative power and having the magnification-varying function, a third lens group III having positive power and having the magnification-varying function, and a fourth lens group IV having positive power and having the magnification-varying function, the zoom lens system according to the present invention being further arranged to fulfill the following conditions (1) through (4):

(1) $1.84 < f_1/f_W < 2.1$
(2) $-0.53 < f_2/f_W < -0.43$
(3) $1.64 < \beta_2 T/\beta_2 W < 1.94$
(4) $1.44 < \beta_3 T \beta_4 T/\beta_3 W \beta_4 W < 1.68$ where, reference symbol $f_i$ represents the focal length of ith lens group, reference symbol $f_W$ represents the focal length of the lens system as a whole in the wide position, reference symbol $\beta_i W$ represents the magnification of ith lens group in the wide position, and reference symbol $\beta_i T$ represents the magnification of ith lens group in the teleposition.

Respective conditions shown in the above are described in detail in the following.

If, in the condition (1), $f_1/f_W$ becomes larger than 2.1, the airspace between the first and second lens groups becomes too large, and it is impossible to arrange the lens system compactly. If $f_1/f_W$ becomes smaller than 1.84, aberrations caused by the first lens group become too large and it is impossible to correct them by the other lens groups.

If, in the condition (2), $f_2/f_W$ becomes smaller than $-0.53$, it is necessary to provide large airspaces in front and rear of the second lens group in order to keep the magnification share in zooming $\beta_2 T/\beta_2 W$ of the second lens group within the range defined by the condition (3) and, therefore, the lens system as a whole cannot be arranged compactly. If $f_2/f_W$ becomes larger than $-0.43$, aberrations caused by the second lens group become too large.

The conditions (3) and (4) respectively define the magnification share in zooming $\beta_2 T/\beta_2 W$ of the second lens group and magnification shares in zooming $\beta_3 T/\beta_3 W$ and $\beta_4 T/\beta_4 W$ of the third and fourth lens groups.

If, in the condition (3), $\beta_2 T/\beta_2 W$ becomes smaller than 1.64, the magnification shares of the third and fourth lens groups increase and, moreover, aberrations caused by the third and fourth lens groups become considerably large. If $\beta_2 T/\beta_2 W$ becomes larger than 1.94, aberrations caused by the second lens group increase.

For the condition (4), the case is the same as the condition (3). That is, when $\beta_3 T \beta_4 T/\beta_3 W \beta_4 W$ defined by the condition (4) becomes smaller than 1.44, the magnification share in zooming of the second lens group increases. If $\beta_3T\beta_4T/\beta_3W\beta_4W$ becomes larger than 1.68, aberrations caused by the third and fourth lens groups become large.

For a zoom lens system which especially fulfills the conditions (1) and (2) out of respective conditions shown in the above, the ratio E.P.W./$f_W$ between the entrance pupil position E.P.W. in the wide position (distance from the front surface of the first lens group to the entrance pupil in the wide position) and focal length $f_W$ of the lens system as a whole in the wide position can be made smaller than 0.85 when the stop is arranged just in front of the third lens group and it is so arranged that the stop is moved together with the third lens group and, therefore, it is possible to make the front lens diameter and outer diameter of the lens system small.

The zoom lens system according to the present invention is arranged to have the basic composition described so far and, at the same time, respective lens groups thereof are arranged to have the lens configuration as shown below due to the reasons to be described later.

That is, the first lens group comprises a negative lens and a positive lens, which are cemented together or arranged separately from each other, and a positive lens.

The second lens group comprises a negative lens, a cemented doublet consisting of a positive lens and a negative lens, and a cemented doublet consisting of a negative lens and a positive lens.

The third lens group comprises at least one positive lens and at least one negative lens.

The fourth lens group comprises a positive lens, a negative lens and at least one more positive lens.

Besides, the zoom lens system according to the present invention is arranged to fulfill the following conditions (5) through (9):

(5) $0.17 < D_1/f_3 < 0.21$ ($D_1 = d_{15} + d_{16} + d_{17} + d_{18}$)
(6) $0.05 < d_{22}/f_4 < 0.08$
(7) $0.125 < n_8 - n_7$
(8) $45 < \nu_4$
(9) $10 < |\nu_6 - \nu_5|$ where, reference symbol $d_i$ represents the thickness of ith lens or ith airspace between lenses, reference symbol $n_i$ represents the refractive index of ith lens, and reference symbol $\nu_i$ represents Abbe's number of ith lens.

When aberrations are caused by the first lens group, those aberrations are enlarged by the vari-focal sub-system. Therefore, for the first lens group, aberrations should be corrected as favourably as possible. For this purpose, the first lens group is arranged to comprise three lens elements and, out of them, the first and second lens elements are cemented together to form a doublet or arranged by leaving a slight airspace between them in order to thereby make chromatic aberration small. Besides, the third lens element is arranged as a positive lens in order to thereby make spherical aberration small.

Besides, as the second lens group has strong negative power, there is such tendency that spherical aberration is overcorrected and variation in aberrations at the time of zooming becomes large. To prevent the above, the second lens group is arranged to comprise a negative lens element and two cemented doublets, i.e., five lens elements in total. Furthermore, refractive indices $n_7$ and $n_8$ of respective lens elements constituting the cemented doublet on the image side in the second lens group are arranged so that they become $n_7 < n_8$ and the difference $n_8 - n_7$ between them becomes 0.125 or more as shown by the condition (7). Thus, the cemented surface of the above-mentioned cemented doublet is arranged to have strong positive power in order to prevent spherical aberration from being overcorrected. Moreover, by selecting Abbe's number $\nu_4$ of the negative lens element arranged on the object side in the second lens group so that it becomes 45 or more as defined by the condition (8), it is so arranged that chromatic aberration to be caused by the second lens group becomes small. Besides, by arranging that the difference $|\nu_6 - \nu_5|$ between Abbe's numbers $\nu_5$ and $\nu_6$ of respective lens elements constituting the cemented doublet on the object side in the second lens group becomes 10 or more as defined by the condition (9), the correcting function of the cemented surface $r_{10}$ of the above-mentioned cemented doublet against chromatic aberration is increased so as to make the variation in chromatic aberration small.

As rays of large numerical aperture which diverge after passing through the second lens group enter the third lens group, a plural number of positive lens elements are arranged on the object side in the third lens group in order to limit spherical aberration to be caused and at least one negative lens element is arranged on the rear side in the third lens group. This negative lens element is provided for the purpose of shifting the principal point of the third lens group toward the second lens group in order to thereby ensure the airspace between the second and third lens groups in the teleposition. Besides, the condition (5) is established for the above-mentioned purpose. If $D_1/f_3$ in the condition (5) becomes smaller than 0.17, the second and third lens groups interfere with each other in the teleposition. If $D_1/f_3$ becomes larger than 0.21, it becomes impossible to ensure the airspace between the third and fourth lens groups in the teleposition and, moreover, it is unfavourable for arranging the lens system compactly.

The fourth lens group is arranged as a lens group of triplet type comprising a positive lens element, negative lens element and positive lens element as the basic composition and is arranged so that the positive lens element on the image side is divided into a plural number of positive lens elements, when it is desired to make the aperture ratio large, in order to thereby increase the aberration correcting function. Besides, the fourth lens group is so arranged that the ratio of the airspace $d_{22}$ between the positive lens on the object side and negative lens to the focal length $f_4$ of the fourth lens group, i.e., the ratio $d_{22}/f_4$, fulfills the condition (6). If $d_{22}/f_4$ becomes smaller than 0.05, the principal point of the fourth lens group comes to a position different from the first lens surface of the fourth lens group and, consequently, it is impossible to ensure the airspace between the third and fourth lens groups in the teleposition. If $d_{22}/f_4$ becomes larger than 0.08, the overall length of the lens system becomes long. Moreover, heights of offaxial rays which pass through the lens element on the rear side become considerably large and this is not desirable for correction of aberrations.

For the zoom lens system according to the present invention, lens configurations of respective lens groups are decided as described in the above and, furthermore, glass materials of respective lens elements are selected so that they fulfill the conditions (10) and (11) shown below.

(10) $1.70 < n_1, n_4, n_6, n_{11}, n_{13}$
(11) $n_2, n_3, n_9, n_{10}, n_{12}, n_{14}, n_{15} < 1.75$

In a high vari-focal ratio zoom lens system, power of the second lens group in the vari-focal sub-system is strong as described in the above and, consequently, there is such tendency that Petzval's sum becomes a negative value with a large absolute value. To prevent this, it is necessary to make refractive indices of negative lens elements high and refractive indices of positive lens elements low. For this purpose, refractive indices are defined that $n_1$, $n_4$, $n_6$, $n_{11}$ and $n_{13}$ are larger than 1.7 as shown by the condition (10) and $n_2$, $n_3$, $n_9$, $n_{10}$, $n_{12}$, $n_{14}$ and $n_{15}$ are smaller than 1.75 as shown by the condition (11).

When the zoom lens system is arranged to further fulfill the conditions (12) and (13) shown below in addition to the fact that refractive indices are defined as described in the above, it is possible to further improve the performance of the lens system.

(12) $-0.1 < f_1/r_6 < 0.8$

(13) $0.14 < f_2/r_{14} < 0.5$ where, reference symbol $r_i$ represents the radius of curvature of ith lens surface.

If, in the condition (12), $f_1/r_6$ becomes smaller than $-0.1$, it is impossible to obtain symmetry of offaxial rays. If $f_1/r_6$ becomes larger than 0.8, the principal point of the first lens group is excessively shifted toward the object side and, as a result, it is impossible to ensure the airspace between the first and second lens groups in the wide position.

If, in the condition (13), $f_2/r_{14}$ becomes smaller than 0.14, symmetry of offaxial rays become unfavourable. If $f_2/r_{14}$ becomes larger than 0.5, it is impossible to ensure the airspace between the second and third lens groups in the teleposition.

As explained in the above, the conditions (12) and (13) are required for improving the quality of image formed by offaxial rays.

As described so far, the zoom lens system according to the present invention which fulfill the above-mentioned respective conditions is a high vari-focal ratio zoom lens system which has favourable performance and is arranged compactly. To minimize the decrease in the performance to be caused in production, it is preferable to reduce the number of cams required for zooming. For this purpose, it is preferable to arrange that the first and fourth lens groups are moved integrally and the second lens group is kept fixed in respect to the image surface.

DETAILED DESCRIPTION OF THE PREFERRED EMBODIMENTS

Figure 1:
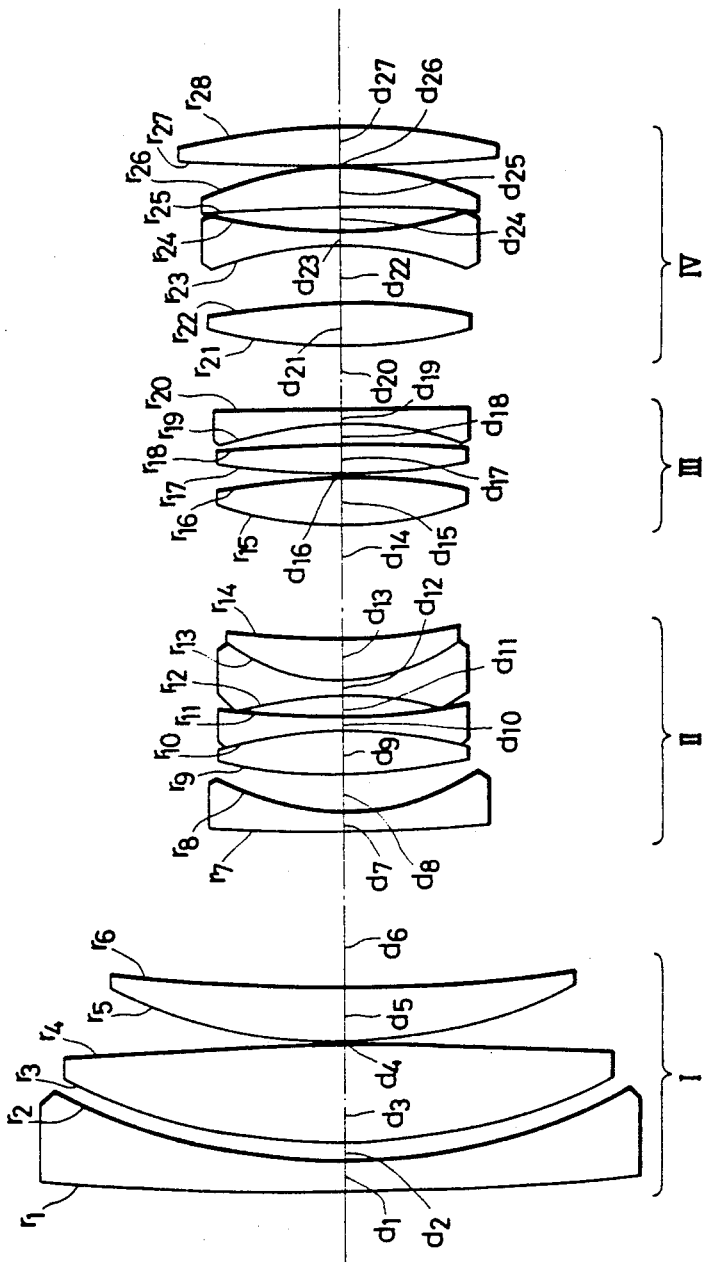
FIG. 1 shows a sectional view of the zoom lens system according to the present invention.
Figure 2:
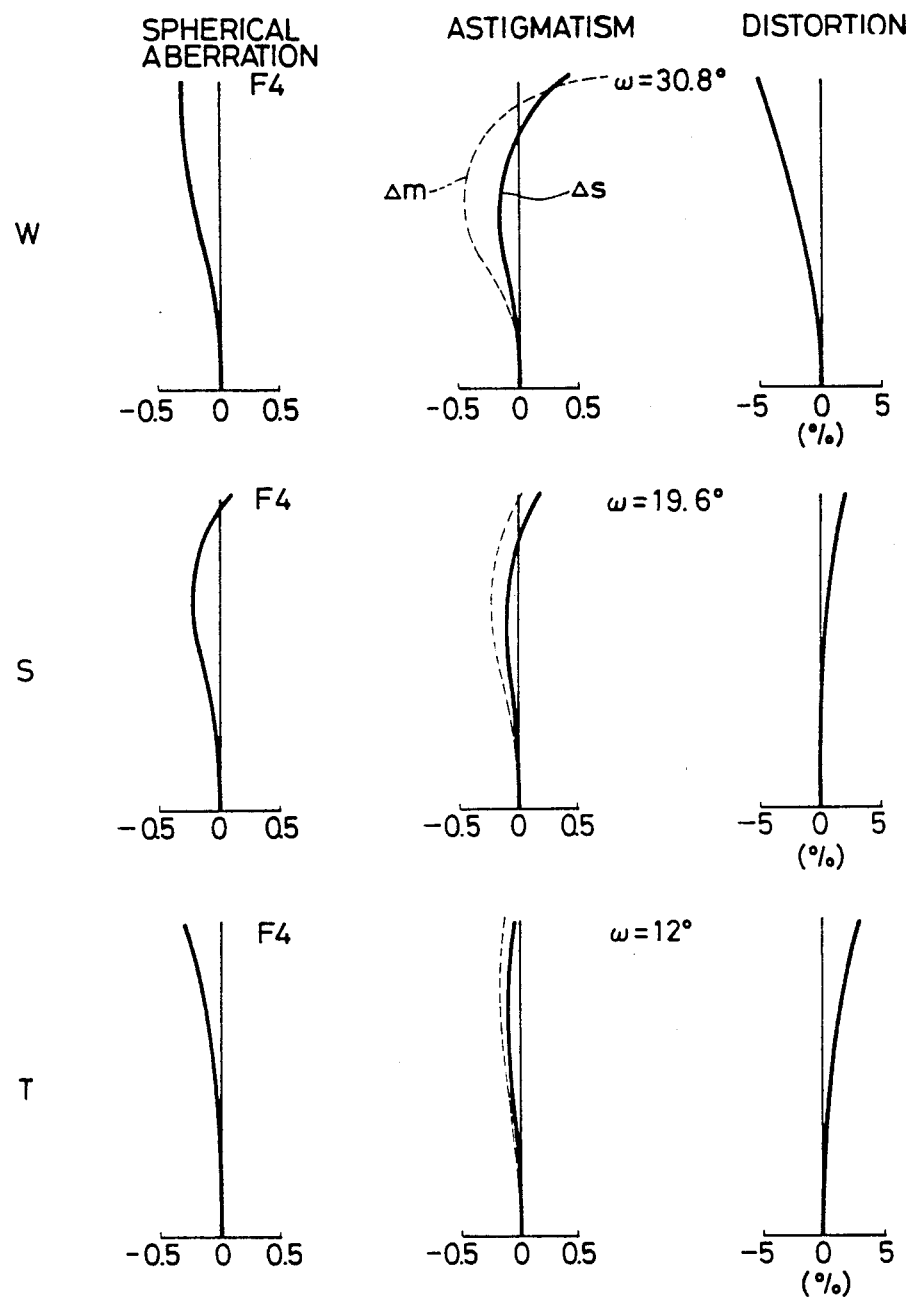
FIGS. 2 through 6 respectively show graphs illustrating aberration curves of Embodiments 1 through 5 of the zoom lens system according to the present invention.
Figure 3:
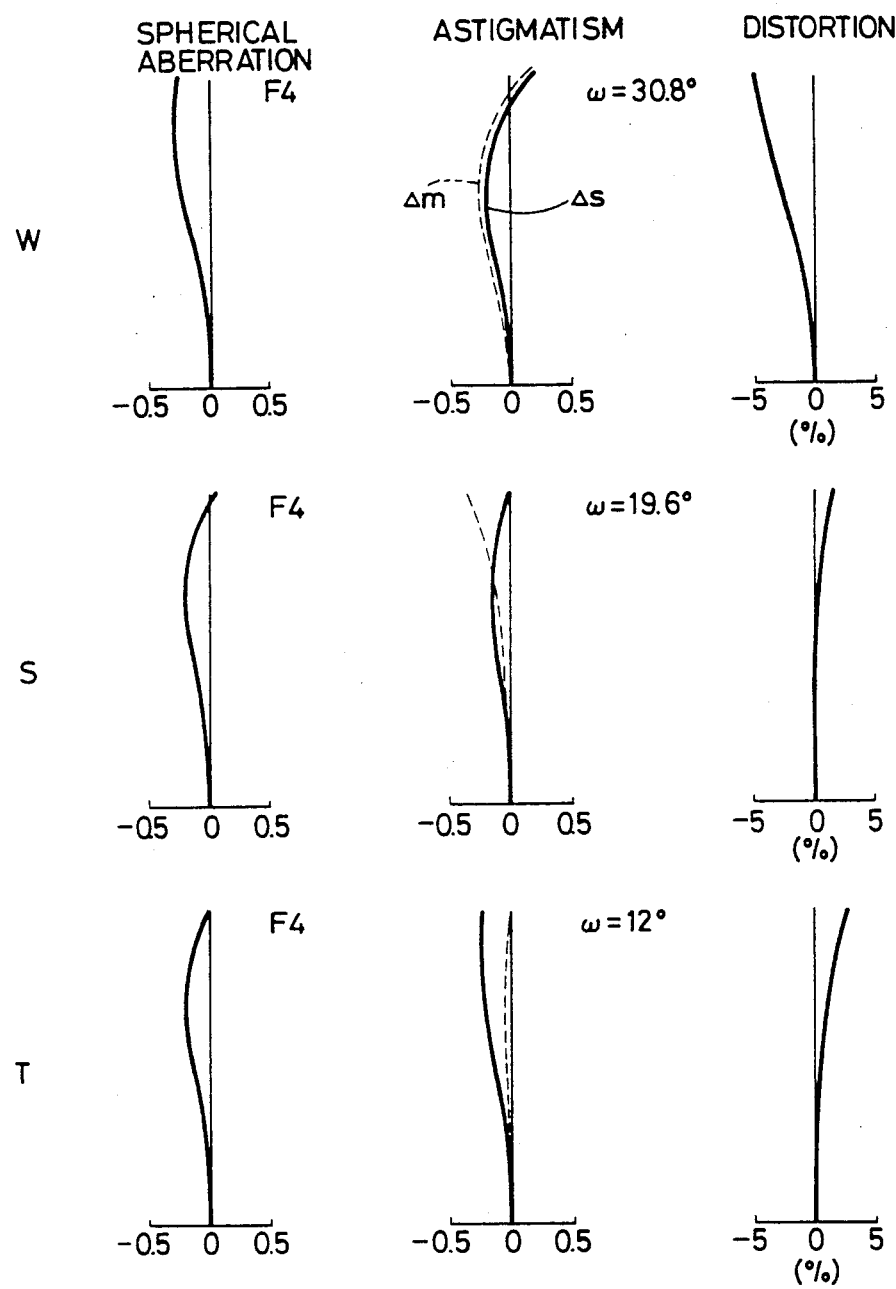
Figure 4:
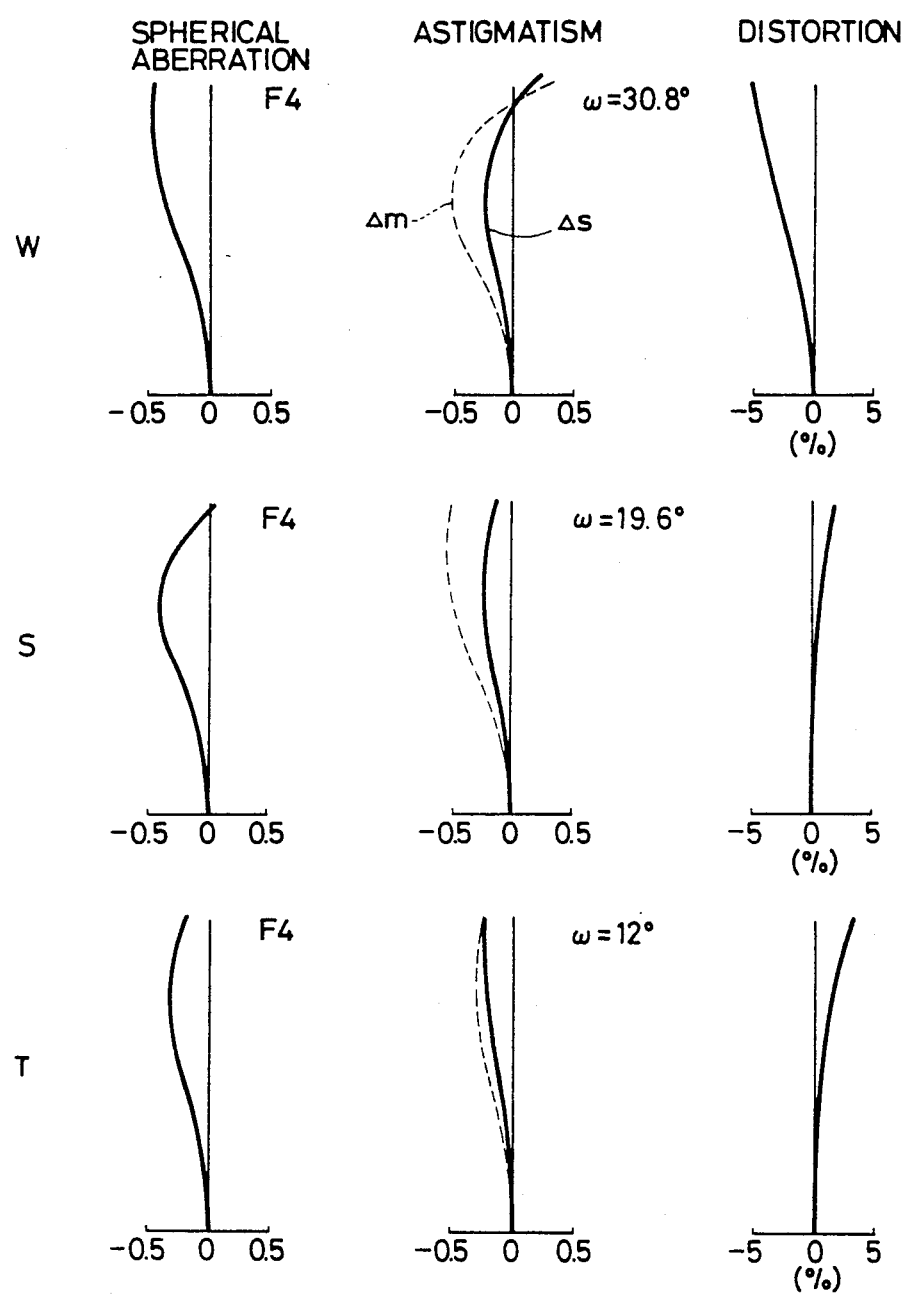
Figure 5:
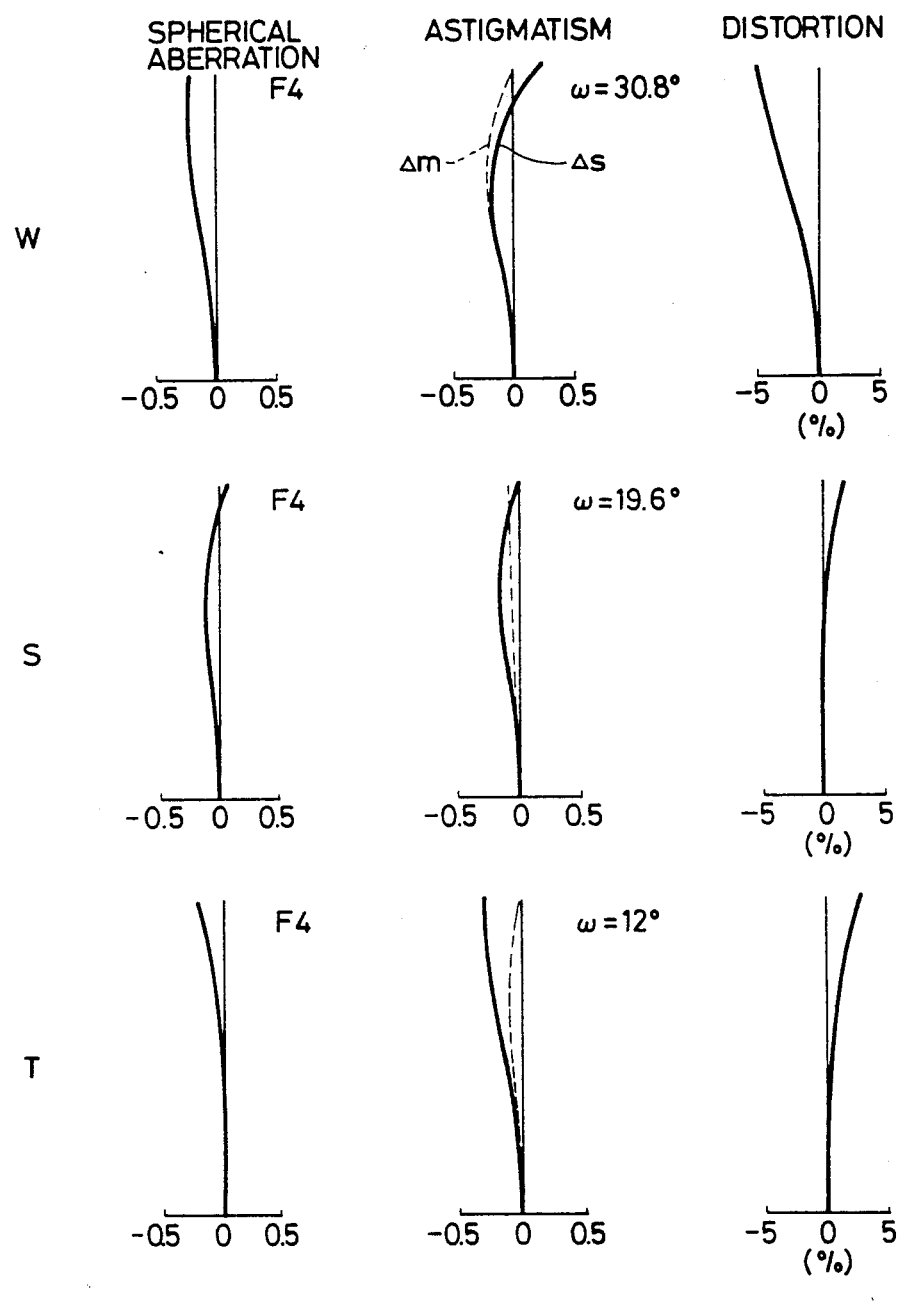
Figure 6:
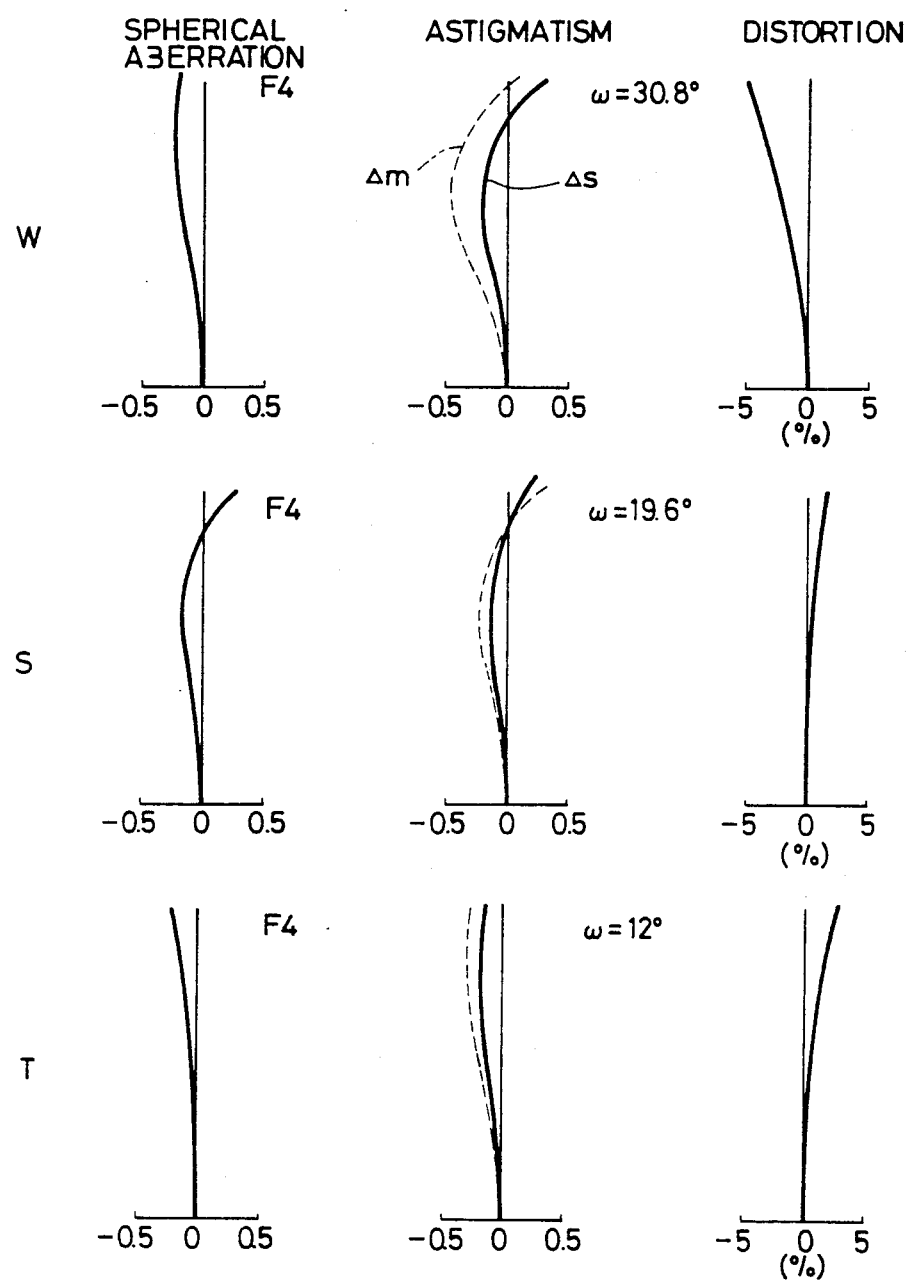

Now, preferred embodiments of the zoom lens system according to the present invention are shown below.

Embodiment 1

$r_1 = 335.0375$
$d_1 = 2.50$  $n_1 = 1.75520$  $\nu_1 = 27.51$
$r_2 = 52.8911$
$d_2 = 1.50$
$r_3 = 54.2150$
$d_3 = 7.80$  $n_2 = 1.69350$  $\nu_2 = 53.23$
$r_4 = -233.8184$
$d_4 = 0.10$
$r_5 = 48.1453$
$d_5 = 5.00$  $n_3 = 1.58913$  $\nu_3 = 60.97$
$r_6 = 146.3716$
$d_6 = $ variable
$r_7 = 139.8650$
$d_7 = 1.50$  $n_4 = 1.77250$  $\nu_4 = 49.66$
$r_8 = 19.9502$
$d_8 = 2.60$
$r_9 = 41.7910$
$d_9 = 3.50$  $n_5 = 1.76182$  $\nu_5 = 26.55$
$r_{10} = -35.8369$
$d_{10} = 1.20$  $n_6 = 1.79952$  $\nu_6 = 42.24$
$r_{11} = 73.2466$
$d_{11} = 1.90$
$r_{12} = -33.4276$
$d_{12} = 1.20$  $n_7 = 1.69350$  $\nu_7 = 50.81$
$r_{13} = 16.3996$
$d_{13} = 3.50$  $n_8 = 1.83400$  $\nu_8 = 37.16$
$r_{14} = 72.5240$
$d_{14} = $ variable
$r_{15} = 31.6103$
$d_{15} = 4.10$  $n_9 = 1.57135$  $\nu_9 = 52.92$
$r_{16} = -43.9682$
$d_{16} = 0.11$
$r_{17} = 62.3577$
$d_{17} = 2.40$  $n_{10} = 1.69350$  $\nu_{10} = 53.23$
$r_{18} = -129.6336$
$d_{18} = 1.60$
$r_{19} = -32.0711$
$d_{19} = 1.20$  $n_{11} = 1.78472$  $\nu_{11} = 25.71$
$r_{20} = 972.6158$
$d_{20} = $ variable
$r_{21} = 45.6347$
$d_{21} = 3.40$  $n_{12} = 1.69680$  $\nu_{12} = 55.52$
$r_{22} = -54.2344$
$d_{22} = 4.32$
$r_{23} = -29.1283$
$d_{23} = 1.20$  $n_{13} = 1.80610$  $\nu_{13} = 40.95$
$r_{24} = 42.1259$
$d_{24} = 1.90$
$r_{25} = -100.1755$
$d_{25} = 3.00$  $n_{14} = 1.69680$  $\nu_{14} = 55.52$
$r_{26} = -27.4404$
$d_{26} = 0.10$
$r_{27} = 360.2235$
$d_{27} = 2.70$  $n_{15} = 1.69680$  $\nu_{15} = 55.52$
$r_{28} = -64.9491$

| f | $d_6$ | $d_{14}$ | $d_{20}$ |
|---|---|---|---|
| 36.22 | 0.6 | 16.09 | 9.74 |
| 60.588 | 12.71 | 8.95 | 4.77 |
| 101.35 | 22.76 | 2.98 | 0.68 | l (overall length) = 133~158
E.P.W/fW = 0.82
$f_1/fW = 2.209$
$f_2/fW = -0.5$
$\beta_2 T/\beta_2 W = 1.712$
$\beta_3 T \beta_4 T / \beta_3 W \beta_4 W = 1.635$
$D_1/f_3 = 0.2062$
$d_{22}/f_4 = 0.0697$
$n_8 - n_7 = 0.141$
$\nu_6 - \nu_5 = 15.7$
$f_1/r_6 = 0.547$
$f_2/r_{r14} = 0.249$ Embodiment 2

$r_1 = 203.0261$
$d_1 = 2.50$  $n_1 = 1.80518$  $\nu_1 = 25.43$
$r_2 = 52.9932$
$d_2 = 0.50$

Embodiment 2

| | | |
|---|---|---|
| $r_3 = 52.9035$ | | |
| $d_3 = 6.80$ | $n_2 = 1.58875$ | $\nu_2 = 51.18$ |
| $r_4 = -140.4751$ | | |
| $d_4 = 0.10$ | | |
| $r_5 = 37.3707$ | | |
| $d_5 = 5.00$ | $n_3 = 1.58913$ | $\nu_3 = 60.97$ |
| $r_6 = 100.0258$ | | |
| $d_6 = $ variable | | |
| $r_7 = 200.2647$ | | |
| $d_7 = 1.40$ | $n_4 = 1.77250$ | $\nu_4 = 49.66$ |
| $r_8 = 18.6880$ | | |
| $d_8 = 2.50$ | | |
| $r_9 = 26.9624$ | | |
| $d_9 = 3.50$ | $n_5 = 1.76182$ | $\nu_5 = 26.55$ |
| $r_{10} = -65.0322$ | | |
| $d_{10} = 1.20$ | $n_6 = 1.78590$ | $\nu_6 = 44.18$ |
| $r_{11} = 31.8034$ | | |
| $d_{11} = 2.50$ | | |
| $r_{12} = -34.5237$ | | |
| $d_{12} = 1.20$ | $n_7 = 1.69680$ | $\nu_7 = 55.52$ |
| $r_{13} = 16.6973$ | | |
| $d_{13} = 3.50$ | $n_8 = 1.83400$ | $\nu_8 = 37.16$ |
| $r_{14} = 83.6591$ | | |
| $d_{14} = $ variable | | |
| $r_{15} = 34.4923$ | | |
| $d_{15} = 3.50$ | $n_9 = 1.51633$ | $\nu_9 = 64.15$ |
| $r_{16} = -51.9510$ | | |
| $d_{16} = 0.11$ | | |
| $r_{17} = 38.2830$ | | |
| $d_{17} = 3.00$ | $n_{10} = 1.58913$ | $\nu_{10} = 60.97$ |
| $r_{18} = -80.4479$ | | |
| $d_{18} = 1.00$ | | |
| $r_{19} = -37.5878$ | | |
| $d_{19} = 1.20$ | $n_{11} = 1.75520$ | $\nu_{11} = 27.51$ |
| $r_{20} = 155.4431$ | | |
| $d_{20} = $ variable | | |
| $r_{21} = 50.0702$ | | |
| $d_{21} = 4.08$ | $n_{12} = 1.72000$ | $\nu_{12} = 50.25$ |
| $r_{22} = -62.1239$ | | |
| $d_{22} = 3.24$ | | |
| $r_{23} = -31.9270$ | | |
| $d_{23} = 1.20$ | $n_{13} = 1.83400$ | $\nu_{13} = 37.16$ |
| $r_{24} = 44.9892$ | | |
| $d_{24} = 2.10$ | | |
| $r_{25} = -304.0858$ | | |
| $d_{25} = 2.50$ | $n_{14} = 1.66672$ | $\nu_{14} = 48.32$ |
| $r_{26} = -27.6090$ | | |
| $d_{26} = 0.10$ | | |
| $r_{27} = 131.0817$ | | |
| $d_{27} = 2.70$ | $n_{15} = 1.69680$ | $\nu_{16} = 55.52$ |
| $r_{28} = -112.5991$ | | |

| f | $d_6$ | $d_{14}$ | $d_{20}$ |
|---|---|---|---|
| 36.22 | 0.69 | 14.77 | 10.80 |
| 60.588 | 12.16 | 8.45 | 6.30 |
| 101.35 | 20.85 | 2.00 | 2.23 |

$l = 133 \sim 152$   E.P.W/fW = 0.82
$f_1/fW = 1.915$
$f_2/fW = -0.449$
$\beta_2 T/\beta_2 W = 1.874$
$\beta_3 T \beta_4 T/\beta_3 W \beta_4 W = 1.5$
$D_1/f_3 = 0.190$
$d_{22}/f_4 = 0.0562$
$n_8 - n_7 = 0.141$
$\nu_6 - \nu_5 = 17.63$
$f_1/r_6 = 0.693$
$f_2/r_{14} = 0.194$

Embodiment 3

| | | |
|---|---|---|
| $r_1 = 645.4805$ | | |
| $d_1 = 2.50$ | $n_1 = 1.75520$ | $\nu_1 = 27.51$ |
| $r_2 = 54.0001$ | | |
| $d_2 = 1.50$ | | |
| $r_3 = 70.5815$ | | |
| $d_3 = 7.80$ | $n_2 = 1.69350$ | $\nu_2 = 53.23$ |
| $r_4 = -414.7811$ | | |
| $d_4 = 0.10$ | | |

Embodiment 3

| | | |
|---|---|---|
| $r_5 = 42.9212$ | | |
| $d_5 = 5.00$ | $n_3 = 1.58913$ | $\nu_3 = 60.97$ |
| $r_6 = -1198.5500$ | | |
| $d_6 = $ variable | | |
| $r_7 = 82.7804$ | | |
| $d_7 = 1.50$ | $n_4 = 1.77250$ | $\nu_4 = 49.66$ |
| $r_8 = 16.7340$ | | |
| $d_8 = 2.30$ | | |
| $r_9 = 21.1341$ | | |
| $d_9 = 3.50$ | $n_5 = 1.76182$ | $\nu_5 = 26.55$ |
| $r_{10} = -209.2856$ | | |
| $d_{10} = 1.20$ | $n_6 = 1.78590$ | $\nu_6 = 44.18$ |
| $r_{11} = 31.2590$ | | |
| $d_{11} = 2.50$ | | |
| $r_{12} = -39.8560$ | | |
| $d_{12} = 1.20$ | $n_7 = 1.69350$ | $\nu_7 = 50.81$ |
| $r_{13} = 14.6466$ | | |
| $d_{13} = 3.50$ | $n_8 = 1.83400$ | $\nu_8 = 37.16$ |
| $r_{14} = 47.9734$ | | |
| $d_{14} = $ variable | | |
| $r_{15} = 28.0985$ | | |
| $d_{15} = 4.00$ | $n_9 = 1.62299$ | $\nu_9 = 58.14$ |
| $r_{16} = -64.5269$ | | |
| $d_{16} = 0.11$ | | |
| $r_{17} = 79.5342$ | | |
| $d_{17} = 3.00$ | $n_{10} = 1.69680$ | $\nu_{10} = 55.52$ |
| $r_{18} = -168.8284$ | | |
| $d_{18} = 0.80$ | | |
| $r_{19} = -32.9358$ | | |
| $d_{19} = 1.20$ | $n_{11} = 1.78472$ | $\nu_{11} = 25.71$ |
| $r_{20} = 730.1423$ | | |
| $d_{20} = $ variable | | |
| $r_{21} = 41.1027$ | | |
| $d_{21} = 3.00$ | $n_{12} = 1.69680$ | $\nu_{12} = 55.52$ |
| $r_{22} = -35.0672$ | | |
| $d_{22} = 3.30$ | | |
| $r_{23} = -21.6397$ | | |
| $d_{23} = 1.20$ | $n_{13} = 1.80610$ | $\nu_{13} = 40.95$ |
| $r_{24} = 50.4233$ | | |
| $d_{24} = 1.90$ | | |
| $r_{25} = -149.3446$ | | |
| $d_{25} = 3.00$ | $n_{14} = 1.69680$ | $\nu_{14} = 55.52$ |
| $r_{26} = -26.9313$ | | |
| $d_{26} = 0.10$ | | |
| $r_{27} = -253.6552$ | | |
| $d_{27} = 2.70$ | $n_{15} = 1.69680$ | $\nu_{15} = 55.52$ |
| $r_{28} = -51.5888$ | | |

| f | $d_6$ | $d_{14}$ | $d_{20}$ |
|---|---|---|---|
| 36.22 | 0.63 | 15.20 | 10.43 |
| 60.588 | 12.09 | 8.02 | 6.84 |
| 101.35 | 20.78 | 1.64 | 3.39 |

$l = 133 \sim 156$   E.P.W/fW = 0.83
$f_1/fW = 2.0362$
$f_2/fW = -0.5060$
$\beta_2 T/\beta_2 W = 1.72$
$\beta_3 T \beta_4 T/\beta_3 W \beta_4 W = 1.625$
$D_1/f_3 = 0.1765$
$d_{22}/f_4 = 0.0638$
$n_8 - n_7 = 0.141$
$\nu_6 - \nu_5 = 17.63$
$f_1/r_6 = -0.062$
$f_2/r_{14} = 0.382$

Embodiment 4

| | | |
|---|---|---|
| $r_1 = 197.9006$ | | |
| $d_1 = 2.50$ | $n_1 = 1.80518$ | $\nu_1 = 25.43$ |
| $r_2 = 53.9572$ | | |
| $d_2 = 0.50$ | | |
| $r_3 = 54.5660$ | | |
| $d_3 = 6.80$ | $n_2 = 1.58875$ | $\nu_2 = 51.18$ |
| $r_4 = -150.4047$ | | |
| $d_4 = 0.10$ | | |
| $r_5 = 37.7484$ | | |
| $d_5 = 5.00$ | $n_3 = 1.58913$ | $\nu_3 = 60.97$ |
| $r_6 = 109.1600$ | | |
| $d_6 = $ variable | | |

-continued

Embodiment 4

| | | |
|---|---|---|
| $r_7 = 156.3896$ | | |
| $d_7 = 1.20$ | $n_4 = 1.77250$ | $\nu_4 = 49.66$ |
| $r_8 = 18.6251$ | | |
| $d_8 = 2.50$ | | |
| $r_9 = 33.5054$ | | |
| $d_9 = 3.50$ | $n_5 = 1.76182$ | $\nu_5 = 26.55$ |
| $r_{10} = -60.0000$ | | |
| $d_{10} = 1.00$ | $n_6 = 1.78590$ | $\nu_6 = 44.18$ |
| $r_{11} = 41.9828$ | | |
| $d_{11} = 2.50$ | | |
| $r_{12} = -30.9917$ | | |
| $d_{12} = 1.00$ | $n_7 = 1.69680$ | $\nu_7 = 55.52$ |
| $r_{13} = 16.8110$ | | |
| $d_{13} = 3.70$ | $n_8 = 1.83400$ | $\nu_8 = 37.16$ |
| $r_{14} = 97.8635$ | | |
| $d_{14} = $ variable | | |
| $r_{15} = 37.4489$ | | |
| $d_{15} = 3.50$ | $n_9 = 1.51454$ | $\nu_9 = 54.69$ |
| $r_{16} = -41.1252$ | | |
| $d_{16} = 0.11$ | | |
| $r_{17} = 36.1897$ | | |
| $d_{17} = 3.00$ | $n_{10} = 1.58913$ | $\nu_{10} = 60.97$ |
| $r_{18} = -73.6336$ | | |
| $d_{18} = 1.00$ | | |
| $r_{19} = -35.5720$ | | |
| $d_{19} = 1.00$ | $n_{11} = 1.75520$ | $\nu_{11} = 27.51$ |
| $r_{20} = 103.4385$ | | |
| $d_{20} = $ variable | | |
| $r_{21} = 55.0435$ | | |
| $d_{21} = 4.63$ | $n_{12} = 1.72000$ | $\nu_{12} = 50.25$ |
| $r_{22} = -59.1821$ | | |
| $d_{22} = 3.29$ | | |
| $r_{23} = -38.3969$ | | |
| $d_{23} = 1.00$ | $n_{13} = 1.83400$ | $\nu_{13} = 37.16$ |
| $r_{24} = 43.1907$ | | |
| $d_{24} = 2.10$ | | |
| $r_{25} = -155.7016$ | | |
| $d_{25} = 2.50$ | $n_{14} = 1.66672$ | $\nu_{14} = 48.32$ |
| $r_{26} = -30.9272$ | | |
| $d_{26} = 0.10$ | | |
| $r_{27} = 110.2227$ | | |
| $d_{27} = 2.70$ | $n_{15} = 1.69680$ | $\nu_{15} = 55.52$ |
| $r_{28} = -92.4991$ | | |

| f | $d_6$ | $d_{14}$ | $d_{20}$ |
|---|---|---|---|
| 36.22 | 0.89 | 14.77 | 11.05 |
| 60.587 | 12.35 | 8.45 | 6.02 |
| 101.35 | 21.04 | 2.49 | 1.83 |

$l = 133 \sim 151$  E.P.W/fW $= 0.82$
$f_1/fW = 1.9087$
$f_2/fW = -0.4502$
$\beta_2 T/\beta_2 W = 1.875$
$\beta_3 T \beta_4 T / \beta_3 W \beta_4 W = 1.49$
$D_1/f_3 = 0.1893$
$d_{22}/f_4 = 0.0575$
$n_8 - n_7 = 0.141$
$\nu_6 - \nu_5 = 17.63$
$f_1/r_6 = 0.633$
$f_2/r_{14} = 0.167$

Embodiment 5

| | | |
|---|---|---|
| $r_1 = 336.5680$ | | |
| $d_1 = 2.50$ | $n_1 = 1.75520$ | $\nu_1 = 27.51$ |
| $r_2 = 51.2875$ | | |
| $d_2 = 1.50$ | | |
| $r_3 = 52.8538$ | | |
| $d_3 = 7.80$ | $n_2 = 1.69350$ | $\nu_2 = 53.23$ |
| $r_4 = -257.2847$ | | |
| $d_4 = 0.10$ | | |
| $r_5 = 44.5048$ | | |
| $d_5 = 4.70$ | $n_3 = 1.58913$ | $\nu_3 = 60.97$ |
| $r_6 = 168.3003$ | | |
| $d_6 = $ variable | | |
| $r_7 = 152.7245$ | | |
| $d_7 = 1.50$ | $n_4 = 1.77250$ | $\nu_4 = 49.66$ |
| $r_8 = 19.3909$ | | |
| $d_8 = 2.90$ | | |

-continued

Embodiment 5

| | | |
|---|---|---|
| $r_9 = 46.1614$ | | |
| $d_9 = 3.50$ | $n_5 = 1.76182$ | $\nu_5 = 26.55$ |
| $r_{10} = -34.3500$ | | |
| $d_{10} = 1.20$ | $n_6 = 1.78590$ | $\nu_6 = 44.18$ |
| $r_{11} = 75.0166$ | | |
| $d_{11} = 1.60$ | | |
| $r_{12} = -34.7288$ | | |
| $d_{12} = 1.20$ | $n_7 = 1.69350$ | $\nu_7 = 53.23$ |
| $r_{13} = 16.2332$ | | |
| $d_{13} = 3.50$ | $n_8 = 1.83400$ | $\nu_8 = 37.16$ |
| $r_{14} = 72.3062$ | | |
| $d_{14} = $ variable | | |
| $r_{15} = 32.3180$ | | |
| $d_{15} = 4.10$ | $n_9 = 1.57250$ | $\nu_9 = 57.76$ |
| $r_{16} = -52.2151$ | | |
| $d_{16} = 0.11$ | | |
| $r_{17} = 60.1866$ | | |
| $d_{17} = 2.40$ | $n_{10} = 1.69100$ | $\nu_{10} = 54.84$ |
| $r_{18} = -147.8576$ | | |
| $d_{18} = 1.60$ | | |
| $r_{19} = -34.8713$ | | |
| $d_{19} = 1.20$ | $n_{11} = 1.78472$ | $\nu_{11} = 25.68$ |
| $r_{20} = 1241.5930$ | | |
| $d_{20} = $ variable | | |
| $r_{21} = 44.5951$ | | |
| $d_{21} = 3.40$ | $n_{12} = 1.69680$ | $\nu_{12} = 55.52$ |
| $r_{22} = -59.0046$ | | |
| $d_{22} = 4.44$ | | |
| $r_{23} = -29.1382$ | | |
| $d_{23} = 1.20$ | $n_{13} = 1.80610$ | $\nu_{13} = 40.95$ |
| $r_{24} = 42.7114$ | | |
| $d_{24} = 1.80$ | | |
| $r_{25} = -124.4920$ | | |
| $d_{25} = 3.17$ | $n_{14} = 1.65830$ | $\nu_{14} = 57.33$ |
| $r_{26} = -27.9011$ | | |
| $d_{26} = 0.10$ | | |
| $r_{27} = 272.8908$ | | |
| $d_{27} = 2.95$ | $n_{15} = 1.65830$ | $\nu_{15} = 57.33$ |
| $r_{28} = -57.0148$ | | |

| f | $d_6$ | $d_{14}$ | $d_{20}$ |
|---|---|---|---|
| 36.22 | 0.82 | 15.84 | 9.51 |
| 60.588 | 12.36 | 8.91 | 4.90 |
| 101.35 | 22.45 | 2.93 | 0.80 |

Figure 7:
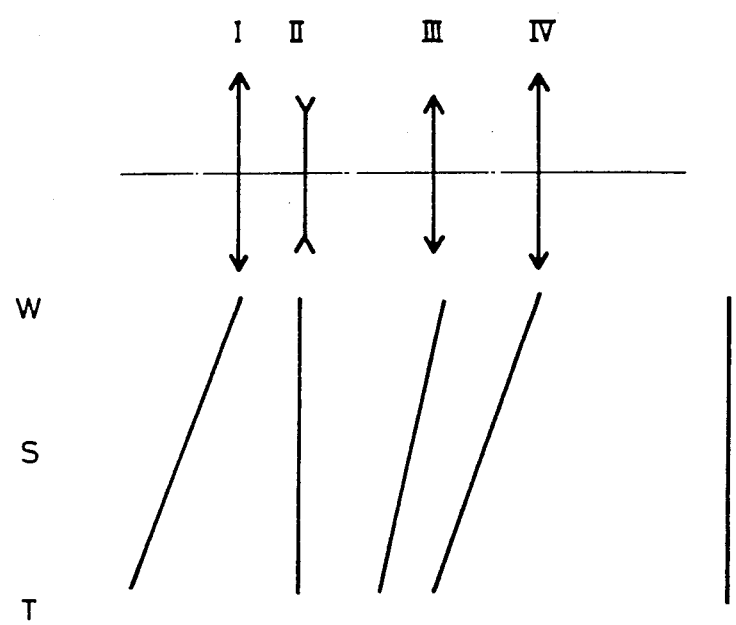
FIG. 7 shows a schematic diagram illustrating the method for moving respective lens groups in the zoom lens system according to the present invention.

$l = 135 \sim 156$  E.P.W/fW $= 0.81$
$f_1/fW = 2.025$
$f_2/fW = -0.481$
$\beta_2 T/\beta_2 W = 1.82$
$\beta_3 T \beta_4 T / \beta_3 W \beta_4 W = 1.53$
$D_1/f_3 = 0.199$
$d_{22}/f_4 = 0.074$
$n_8 - n_7 = 0.141$
$\nu_6 - \nu_5 = 17.63$
$f_1/r_6 = 0.436$
$f_2/r_{14} = 0.241$ Out of respective embodiments shown in the above, Embodiment 5 illustrates a zoom lens system arranged so that the first and fourth lens groups are move integrally and the second lens group is kept fixed in respect to the image surface. Graphs illustrating aberration curves of the above-mentioned Embodiments 1 through 5 are respectively shown in FIGS. 2 through 6. In these graphs of aberration curves, graphs marked with W show aberration curves in the wide position, graphs marked with S show aberration curves in the standard position, and graphs marked with T show aberration curves in the teleposition. The method for moving respective lens groups at the time of zooming is shown in FIG. 7.

We claim:

1. A zoom lens system comprising a first lens group having positive power and having the focusing function, a second lens group having negative power and having the magnification-varying function, a third lens group having positive power and having the magnification-varying function, and a fourth lens group having positive power and having the magnification-varying function, said zoom lens system according to the present invention being arranged to fulfill the conditions (1) through (4) shown below:

(1) $1.84 < f_1/f_W < 2.1$
(2) $-0.53 < f_2/f_W < -0.43$
(3) $1.64 < \beta_2 T/\beta_2 W < 1.94$
(4) $1.44 < \beta_3 T \beta_4 T/\beta_3 W \beta_4 W < 1.68$ where, reference symbol $f_i$ represents the focal length of ith lens group, reference symbol $f_W$ represents the focal length of the lens system as a whole in the wide position, reference symbol $\beta iW$ represents the magnification of ith lens group in the wide position, and reference symbol $\beta iT$ represents the magnification of ith lens group in the teleposition.

2. A zoom lens system according to claim 1 wherein said first lens group comprises a negative lens element, a positive lens element and a positive lens element, said second lens group comprises a negative lens element, a cemented doublet consisting of a positive lens element and a negative lens element, and a cemented doublet consisting of a negative lens element and a positive lens element, said third lens group comprises at least one positive lens element and at least one negative lens element, and said fourth lens group comprises a positive lens element, a negative lens element and at least one more positive lens element in the order from the object side, said zoom lens system being arranged to further fulfill the conditions (5) through (9) shown below:

(5) $0.17 < D_1/f_3 < 0.21$, $D_1 = d_{15} + d_{16} + d_{17} + d_{18}$
(6) $0.05 < d_{22}/f_4 < 0.08$
(7) $0.125 < n_8 - n_7$
(8) $45 < \nu_4$
(9) $10 < |\nu_6 - \nu_5|$ where, reference symbol $d_i$ represents ith distance between lens surfaces, reference symbol $n_i$ represents the refractive index of ith lens, and reference symbol $\nu_i$ represents Abbe's number of ith lens.

3. A zoom lens system according to claim 2 wherein said first lens group comprises a cemented doublet, which consists of a negative lens element and a positive lens element, and a positive lens.

4. A zoom lens system according to claim 2 further fulfilling the conditions (10) and (11) shown below:

(10) $1.70 < n_1, n_4, n_6, n_{11}, n_{13}$
(11) $n_2, n_3, n_9, n_{10}, n_{12}, n_{14}, n_{15} < 1.75$.

5. A zoom lens system according to claim 3 further fulfilling the conditions (10) and (11) shown below:

(10) $1.70 < n_1, n_4, n_6, n_{11}, n_{13}$
(11) $n_2, n_3, n_9, n_{10}, n_{12}, n_{14}, n_{15} < 1.75$.

6. A zoom lens system according to claim 4 further fulfilling the conditions (12) and (13) shown below:

(12) $-0.1 < f_1/r_6 < 0.8$
(13) $0.14 < f_2/r_{14} < 0.5$ where, reference symbol $r_i$ represents the radius of curvature of ith lens surface.

7. A zoom lens system according to claim 1 wherein a stop is located just in front of said third lens group and is arranged to move together with said third lens group.

8. A zoom lens system according to claim 6 wherein said zoom lens system has the following numerical data $r_1 = 335.0375$ -continued

| | | |
|---|---|---|
| $d_1 = 2.50$ | $n_1 = 1.75520$ | $\nu_1 = 27.51$ |
| $r_2 = 52.8911$ | | |
| $d_2 = 1.50$ | | |
| $r_3 = 54.2150$ | | |
| $d_3 = 7.80$ | $n_2 = 1.69350$ | $\nu_2 = 53.23$ |
| $r_4 = -233.8184$ | | |
| $d_4 = 0.10$ | | |
| $r_5 = 48.1453$ | | |
| $d_5 = 5.00$ | $n_3 = 1.58913$ | $\nu_3 = 60.97$ |
| $r_6 = 146.3716$ | | |
| $d_6 = $ variable | | |
| $r_7 = 139.8650$ | | |
| $d_7 = 1.50$ | $n_4 = 1.77250$ | $\nu_4 = 49.66$ |
| $r_8 = 19.9502$ | | |
| $d_8 = 2.60$ | | |
| $r_9 = 41.7910$ | | |
| $d_9 = 3.50$ | $n_5 = 1.76182$ | $\nu_5 = 26.55$ |
| $r_{10} = -35.8369$ | | |
| $d_{10} = 1.20$ | $n_6 = 1.79952$ | $\nu_6 = 42.24$ |
| $r_{11} = 73.2466$ | | |
| $d_{11} = 1.90$ | | |
| $r_{12} = -33.4276$ | | |
| $d_{12} = 1.20$ | $n_7 = 1.69350$ | $\nu_7 = 50.81$ |
| $r_{13} = 16.3996$ | | |
| $d_{13} = 3.50$ | $n_8 = 1.83400$ | $\nu_8 = 37.16$ |
| $r_{14} = 72.5240$ | | |
| $d_{14} = $ variable | | |
| $r_{15} = 31.6103$ | | |
| $d_{15} = 4.10$ | $n_9 = 1.57135$ | $\nu_9 = 52.92$ |
| $r_{16} = -43.9682$ | | |
| $d_{16} = 0.11$ | | |
| $r_{17} = 62.3577$ | | |
| $d_{17} = 2.40$ | $n_{10} = 1.69350$ | $\nu_{10} = 53.23$ |
| $r_{18} = -129.6336$ | | |
| $d_{18} = 1.60$ | | |
| $r_{19} = -32.0711$ | | |
| $d_{19} = 1.20$ | $n_{11} = 1.78472$ | $\nu_{11} = 25.71$ |
| $r_{20} = 972.6158$ | | |
| $d_{20} = $ variable | | |
| $r_{21} = 45.6347$ | | |
| $d_{21} = 3.40$ | $n_{12} = 1.69680$ | $\nu_{12} = 55.52$ |
| $r_{22} = -54.2344$ | | |
| $d_{22} = 4.32$ | | |
| $r_{23} = -29.1283$ | | |
| $d_{23} = 1.20$ | $n_{13} = 1.80610$ | $\nu_{13} = 40.95$ |
| $r_{24} = 42.1259$ | | |
| $d_{24} = 1.90$ | | |
| $r_{25} = -100.1755$ | | |
| $d_{25} = 3.00$ | $n_{14} = 1.69680$ | $\nu_{14} = 55.52$ |
| $r_{26} = -27.4404$ | | |
| $d_{26} = 0.10$ | | |
| $r_{27} = 360.2235$ | | |
| $d_{27} = 2.70$ | $n_{15} = 1.69680$ | $\nu_{15} = 55.52$ |
| $r_{28} = -64.9491$ | | |

| f | $d_6$ | $d_{14}$ | $d_{20}$ |
|---|---|---|---|
| 36.22 | 0.6 | 16.09 | 9.74 |
| 60.588 | 12.71 | 8.95 | 4.77 |
| 101.35 | 22.76 | 2.98 | 0.68 |

$l = 133 \sim 158$  E.P.W/fW = 0.82
$f_1/fW = 2.209$
$f_2/fW = -0.5$
$\beta_2 T/\beta_2 W = 1.712$
$\beta_3 T \beta_4 T/\beta_3 W \beta_4 W = 1.635$
$D_1/f_3 = 0.2062$
$d_{22}/f_4 = 0.0697$
$n_8 - n_7 = 0.141$
$\nu_6 - \nu_5 = 15.7$
$f_1/r_6 = 0.547$
$f_2/r_{14} = 0.249$.

9. A zoom lens system according to claim 6 wherein said zoom lens system has the following numerical data

| | | |
|---|---|---|
| $r_1 = 203.0261$ | | |
| $d_1 = 2.50$ | $n_1 = 1.80518$ | $\nu_1 = 25.43$ |
| $r_2 = 52.9932$ | | |
| $d_2 = 0.50$ | | |

-continued

| | | |
|---|---|---|
| $r_3 = 52.9035$ | | |
| $d_3 = 6.80$ | $n_2 = 1.58875$ | $\nu_2 = 51.18$ |
| $r_4 = -140.4751$ | | |
| $d_4 = 0.10$ | | |
| $r_5 = 37.3707$ | | |
| $d_5 = 5.00$ | $n_3 = 1.58913$ | $\nu_3 = 60.97$ |
| $r_6 = 100.0258$ | | |
| $d_6 = $ variable | | |
| $r_7 = 200.2647$ | | |
| $d_7 = 1.40$ | $n_4 = 1.77250$ | $\nu_4 = 49.66$ |
| $r_8 = 18.6880$ | | |
| $d_8 = 2.50$ | | |
| $r_9 = 26.9624$ | | |
| $d_9 = 3.50$ | $n_5 = 1.76182$ | $\nu_5 = 26.55$ |
| $r_{10} = -65.0322$ | | |
| $d_{10} = 1.20$ | $n_6 = 1.78590$ | $\nu_6 = 44.18$ |
| $r_{11} = 31.8034$ | | |
| $d_{11} = 2.50$ | | |
| $r_{12} = -34.5237$ | | |
| $d_{12} = 1.20$ | $n_7 = 1.69680$ | $\nu_7 = 55.52$ |
| $r_{13} = 16.6973$ | | |
| $d_{13} = 3.50$ | $n_8 = 1.83400$ | $\nu_8 = 37.16$ |
| $r_{14} = 83.6591$ | | |
| $d_{14} = $ variable | | |
| $r_{15} = 34.4923$ | | |
| $d_{15} = 3.50$ | $n_9 = 1.51633$ | $\nu_9 = 64.15$ |
| $r_{16} = -51.9510$ | | |
| $d_{16} = 0.11$ | | |
| $r_{17} = 38.2830$ | | |
| $d_{17} = 3.00$ | $n_{10} = 1.58913$ | $\nu_{10} = 60.97$ |
| $r_{18} = -80.4479$ | | |
| $d_{18} = 1.00$ | | |
| $r_{19} = -37.5878$ | | |
| $d_{19} = 1.20$ | $n_{11} = 1.75520$ | $\nu_{11} = 27.51$ |
| $r_{20} = 155.4431$ | | |
| $d_{20} = $ variable | | |
| $r_{21} = 50.0702$ | | |
| $d_{21} = 4.08$ | $n_{12} = 1.72000$ | $\nu_{12} = 50.25$ |
| $r_{22} = -62.1239$ | | |
| $d_{22} = 3.24$ | | |
| $r_{23} = -31.9270$ | | |
| $d_{23} = 1.20$ | $n_{13} = 1.83400$ | $\nu_{13} = 37.16$ |
| $r_{24} = 44.9892$ | | |
| $d_{24} = 2.10$ | | |
| $r_{25} = -304.0858$ | | |
| $d_{25} = 2.50$ | $n_{14} = 1.66672$ | $\nu_{14} = 48.32$ |
| $r_{26} = -27.6090$ | | |
| $d_{26} = 0.10$ | | |
| $r_{27} = 131.0817$ | | |
| $d_{27} = 2.70$ | $n_{15} = 1.69680$ | $\nu_{15} = 55.52$ |
| $r_{28} = -112.5991$ | | |

| f | $d_6$ | $d_1$ | $d_{20}$ |
|---|---|---|---|
| 36.22 | 0.69 | 14.77 | 10.80 |
| 60.588 | 12.16 | 8.45 | 6.30 |
| 101.35 | 20.85 | 2.00 | 2.23 |

$l = 133 \sim 152 \quad E.P.W/fW = 0.82$
$f_1/fW = 1.915$
$f_2/fW = -0.449$
$\beta_2 T/\beta_2 W = 1.874$
$\beta_3 T \beta_4 T/\beta_3 W \beta_4 W = 1.5$
$D_1/f_3 = 0.190$
$d_{22}/f_4 = 0.0562$
$n_8 - n_7 = 0.141$
$\nu_6 - \nu_5 = 17.63$
$f_1/r_6 = 0.693$
$f_2/r_{14} = 0.194$.

10. A zoom lens system according to claim 6 wherein said zoom lens system has the following numerical data

| | | |
|---|---|---|
| $r_1 = 645.4805$ | | |
| $d_1 = 2.50$ | $n_1 = 1.75520$ | $\nu_1 = 27.51$ |
| $r_2 = 54.0001$ | | |
| $d_2 = 1.50$ | | |
| $r_3 = 70.5815$ | | |
| $d_3 = 7.80$ | $n_2 = 1.69350$ | $\nu_2 = 53.23$ |
| $r_4 = -414.7811$ | | |

-continued

| | | |
|---|---|---|
| $d_4 = 0.10$ | | |
| $r_5 = 42.9212$ | | |
| $d_5 = 5.00$ | $n_3 = 1.58913$ | $\nu_3 = 60.97$ |
| $r_6 = -1198.5500$ | | |
| $d_6 = $ variable | | |
| $r_7 = 82.7804$ | | |
| $d_7 = 1.50$ | $n_4 = 1.77250$ | $\nu_4 = 49.66$ |
| $r_8 = 16.7340$ | | |
| $d_8 = 2.30$ | | |
| $r_9 = 21.1341$ | | |
| $d_9 = 3.50$ | $n_5 = 1.76182$ | $\nu_5 = 26.55$ |
| $r_{10} = -209.2856$ | | |
| $d_{10} = 1.20$ | $n_6 = 1.78590$ | $\nu_6 = 44.18$ |
| $r_{11} = 31.2590$ | | |
| $d_{11} = 2.50$ | | |
| $r_{12} = -39.8560$ | | |
| $d_{12} = 1.20$ | $n_7 = 1.69350$ | $\nu_7 = 50.81$ |
| $r_{13} = 14.6466$ | | |
| $d_{13} = 3.50$ | $n_8 = 1.83400$ | $\nu_8 = 37.16$ |
| $r_{14} = 47.9734$ | | |
| $d_{14} = $ variable | | |
| $r_{15} = 28.0985$ | | |
| $d_{15} = 4.00$ | $n_9 = 1.62299$ | $\nu_9 = 58.14$ |
| $r_{16} = -64.5269$ | | |
| $d_{16} = 0.11$ | | |
| $r_{17} = 79.5342$ | | |
| $d_{17} = 3.00$ | $n_{10} = 1.69680$ | $\nu_{10} = 55.52$ |
| $r_{18} = -168.8284$ | | |
| $d_{18} = 0.80$ | | |
| $r_{19} = -32.9358$ | | |
| $d_{19} = 1.20$ | $n_{11} = 1.78472$ | $\nu_{11} = 25.71$ |
| $r_{20} = 730.1423$ | | |
| $d_{20} = $ variable | | |
| $r_{21} = 41.1027$ | | |
| $d_{21} = 3.00$ | $n_{12} = 1.69680$ | $\nu_{12} = 55.52$ |
| $r_{22} = -35.0672$ | | |
| $d_{22} = 3.30$ | | |
| $r_{23} = -21.6397$ | | |
| $d_{23} = 1.20$ | $n_{13} = 1.80610$ | $\nu_{13} = 40.95$ |
| $r_{24} = 50.4233$ | | |
| $d_{24} = 1.90$ | | |
| $r_{25} = -149.3446$ | | |
| $d_{25} = 3.00$ | $n_{14} = 1.69680$ | $\nu_{14} = 55.52$ |
| $r_{26} = -26.9313$ | | |
| $d_{26} = 0.10$ | | |
| $r_{27} = -253.6552$ | | |
| $d_{27} = 2.70$ | $n_{15} = 1.69680$ | $\nu_{15} = 55.52$ |
| $r_{28} = -51.5888$ | | |

| f | $d_6$ | $d_{14}$ | $d_{20}$ |
|---|---|---|---|
| 36.22 | 0.63 | 15.20 | 10.43 |
| 60.588 | 12.09 | 8.02 | 6.84 |
| 101.35 | 20.78 | 1.64 | 3.39 |

$l = 133 \sim 156 \quad E.P.W/fW = 0.83$
$f_1/fW = 2.0362$
$f_2/fW = -0.5060$
$\beta_2 T/\beta_2 W = 1.72$
$\beta_3 T \beta_4 T/\beta_3 W \beta_4 W = 1.625$
$D_1/f_3 = 0.1765$
$d_{22}/f_4 = 0.0638$
$n_8 - n_7 = 0.141$
$\nu_6 - \nu_5 = 17.63$
$f_1/r_6 = -0.062$
$f_2/r_{14} = 0.382$.

11. A zoom lens system according to claim 6 wherein said zoom lens system has the following numerical data

| | | |
|---|---|---|
| $r_1 = 197.9006$ | | |
| $d_1 = 2.50$ | $n_1 = 1.80518$ | $\nu_1 = 25.43$ |
| $r_2 = 53.9572$ | | |
| $d_2 = 0.50$ | | |
| $r_3 = 54.5660$ | | |
| $d_3 = 6.80$ | $n_2 = 1.58875$ | $\nu_2 = 51.18$ |
| $r_4 = -150.4047$ | | |
| $d_4 = 0.10$ | | |
| $r_5 = 37.7484$ | | |
| $d_5 = 5.00$ | $n_3 = 1.58913$ | $\nu_3 = 60.97$ |

-continued

| | | |
|---|---|---|
| $r_6 = 109.1600$ | | |
| $d_6 =$ variable | | |
| $r_7 = 156.3896$ | | |
| $d_7 = 1.20$ | $n_4 = 1.77250$ | $\nu_4 = 49.66$ |
| $r_8 = 18.6251$ | | |
| $d_8 = 2.50$ | | |
| $r_9 = 33.5054$ | | |
| $d_9 = 3.50$ | $n_5 = 1.76182$ | $\nu_5 = 26.55$ |
| $r_{10} = -60.0000$ | | |
| $d_{10} = 1.00$ | $n_6 = 1.78590$ | $\nu_6 = 44.18$ |
| $r_{11} = 41.9828$ | | |
| $d_{11} = 2.50$ | | |
| $r_{12} = -30.9917$ | | |
| $d_{12} = 1.00$ | $n_7 = 1.69680$ | $\nu_7 = 55.52$ |
| $r_{13} = 16.8110$ | | |
| $d_{13} = 3.70$ | $n_8 = 1.83400$ | $\nu_8 = 37.16$ |
| $r_{14} = 97.8635$ | | |
| $d_{14} =$ variable | | |
| $r_{15} = 37.4489$ | | |
| $d_{15} = 3.50$ | $n_9 = 1.51454$ | $\nu_9 = 54.69$ |
| $r_{16} = -41.1252$ | | |
| $d_{16} = 0.11$ | | |
| $r_{17} = 36.1897$ | | |
| $d_{17} = 3.00$ | $n_{10} = 1.58913$ | $\nu_{10} = 60.97$ |
| $r_{18} = -73.6336$ | | |
| $d_{18} = 1.00$ | | |
| $r_{19} = -35.5720$ | | |
| $d_{19} = 1.00$ | $n_{11} = 1.75520$ | $\nu_{11} = 27.51$ |
| $r_{20} = 103.4385$ | | |
| $d_{20} =$ variable | | |
| $r_{21} = 55.0435$ | | |
| $d_{21} = 4.63$ | $n_{12} = 1.72000$ | $\nu_{12} = 50.25$ |
| $r_{22} = -59.1821$ | | |
| $d_{22} = 3.29$ | | |
| $r_{23} = -38.3969$ | | |
| $d_{23} = 1.00$ | $n_{13} = 1.83400$ | $\nu_{13} = 37.16$ |
| $r_{24} = 43.1907$ | | |
| $d_{24} = 2.10$ | | |
| $r_{25} = -155.7016$ | | |
| $d_{25} = 2.50$ | $n_{14} = 1.66672$ | $\nu_{14} = 48.32$ |
| $r_{26} = -30.9272$ | | |
| $d_{26} = 0.10$ | | |
| $r_{27} = 110.2227$ | | |
| $d_{27} = 2.70$ | $n_{15} = 1.69680$ | $\nu_{15} = 55.52$ |
| $r_{28} = -92.4991$ | | |

| f | $d_6$ | $d_{14}$ | $d_{20}$ |
|---|---|---|---|
| 36.22 | 0.89 | 14.77 | 11.05 |
| 60.587 | 12.35 | 8.45 | 6.02 |
| 101.35 | 21.04 | 2.49 | 1.83 |

$l = 133 \sim 151$   E.P.W/fW = 0.82
$f_1/fW = 1.9087$
$f_2/fW = -0.4502$
$\beta_2T/\beta_2W = 1.875$
$\beta_3T\beta_4T/\beta_3W\beta_4W = 1.49$
$D_1/f_3 = 0.1893$
$d_{22}/f_4 = 0.0575$
$n_8 - n_7 = 0.141$
$\nu_6 - \nu_5 = 17.63$
$f_1/r_6 = 0.633$
$f_2/r_{14} = 0.167$.

12. A zoom lens system according to claim 6 wherein said zoom lens system is arranged to vary the magnification by moving said first lens group and said fourth lens group integrally, keeping said second lens group fixed in respect to the image surface, and moving said third lens group independently of said first lens group and said fourth lens group.

13. A zoom lens system according to claim 12 wherein said zoom lens system has the following numerical data

| | | |
|---|---|---|
| $r_1 = 336.5680$ | | |
| $d_1 = 2.50$ | $n_1 = 1.75520$ | $\nu_1 = 27.51$ |
| $r_2 = 51.2875$ | | |
| $d_2 = 1.50$ | | |
| $r_3 = 52.8538$ | | |
| $d_3 = 7.80$ | $n_2 = 1.69350$ | $\nu_2 = 53.23$ |
| $r_4 = -257.2847$ | | |
| $d_4 = 0.10$ | | |
| $r_5 = 44.5048$ | | |
| $d_5 = 4.70$ | $n_3 = 1.58913$ | $\nu_3 = 60.97$ |
| $r_6 = 168.3003$ | | |
| $d_6 =$ variable | | |
| $r_7 = 152.7245$ | | |
| $d_7 = 1.50$ | $n_4 = 1.77250$ | $\nu_4 = 49.66$ |
| $r_8 = 19.3909$ | | |
| $d_8 = 2.90$ | | |
| $r_9 = 46.1614$ | | |
| $d_9 = 3.50$ | $n_5 = 1.76182$ | $\nu_5 = 26.55$ |
| $r_{10} = -34.3500$ | | |
| $d_{10} = 1.20$ | $n_6 = 1.78590$ | $\nu_6 = 44.18$ |
| $r_{11} = 75.0166$ | | |
| $d_{11} = 1.60$ | | |
| $r_{12} = -34.7288$ | | |
| $d_{12} = 1.20$ | $n_7 = 1.69350$ | $\nu_7 = 53.23$ |
| $r_{13} = 16.2332$ | | |
| $d_{13} = 3.50$ | $n_8 = 1.83400$ | $\nu_8 = 37.16$ |
| $r_{14} = 72.3062$ | | |
| $d_{14} =$ variable | | |
| $r_{15} = 32.3180$ | | |
| $d_{15} = 4.10$ | $n_9 = 1.57250$ | $\nu_9 = 57.76$ |
| $r_{16} = -52.2151$ | | |
| $d_{16} = 0.11$ | | |
| $r_{17} = 60.1866$ | | |
| $d_{17} = 2.40$ | $n_{10} = 1.69100$ | $\nu_{10} = 54.84$ |
| $r_{18} = -147.8576$ | | |
| $d_{18} = 1.60$ | | |
| $r_{19} = -34.8713$ | | |
| $d_{19} = 1.20$ | $n_{11} = 1.78472$ | $\nu_{11} = 25.68$ |
| $r_{20} = 1241.5930$ | | |
| $d_{20} =$ variable | | |
| $r_{21} = 44.5951$ | | |
| $d_{21} = 3.40$ | $n_{12} = 1.69680$ | $\nu_{12} = 55.52$ |
| $r_{22} = -59.0046$ | | |
| $d_{22} = 4.44$ | | |
| $r_{23} = -29.1382$ | | |
| $d_{23} = 1.20$ | $n_{13} = 1.80610$ | $\nu_{13} = 40.95$ |
| $r_{24} = 42.7114$ | | |
| $d_{24} = 1.80$ | | |
| $r_{25} = -124.4920$ | | |
| $d_{25} = 3.17$ | $n_{14} = 1.65830$ | $\nu_{14} = 57.33$ |
| $r_{26} = -27.9011$ | | |
| $d_{26} = 0.10$ | | |
| $r_{27} = 272.8908$ | | |
| $d_{27} = 2.95$ | $n_{15} = 1.65830$ | $\nu_{15} = 57.33$ |
| $r_{28} = -57.0148$ | | |

| f | $d_6$ | $d_{14}$ | $d_{20}$ |
|---|---|---|---|
| 36.22 | 0.82 | 15.84 | 9.51 |
| 60.588 | 12.36 | 8.91 | 4.90 |
| 101.35 | 22.45 | 2.93 | 0.80 |

$l = 135 \sim 156$   E.P.W/fW = 0.81
$f_1/fW = 2.025$
$f_2/fW = -0.481$
$\beta_2T/\beta_2W = 1.82$
$\beta_3T\beta_4T/\beta_3W\beta_4W = 1.53$
$D_1/f_3 = 0.199$
$d_{22}/f_4 = 0.074$
$n_8 - n_7 = 0.141$
$\nu_6 - \nu_5 = 17.63$
$f_1/r_6 = 0.436$
$f_2/r_{14} = 0.241$.

* * * * *